(12) United States Patent
Namuduri

(10) Patent No.: US 12,606,037 B2
(45) Date of Patent: Apr. 21, 2026

(54) FUEL CELL-BASED VEHICLE-TO-VEHICLE CHARGING

(71) Applicant: GM GLOBAL TECHNOLOGY OPERATIONS LLC, Detroit, MI (US)

(72) Inventor: Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 857 days.

(21) Appl. No.: 17/948,596

(22) Filed: Sep. 20, 2022

(65) Prior Publication Data

US 2024/0092199 A1     Mar. 21, 2024

(51) Int. Cl.
*H02J 7/00* (2006.01)
*B60L 53/14* (2019.01)
*B60L 53/22* (2019.01)
*H02J 7/14* (2006.01)

(52) U.S. Cl.
CPC .............. *B60L 53/22* (2019.02); *B60L 53/14* (2019.02)

(58) Field of Classification Search
CPC .......... B60L 3/00; B60L 3/0053; B60L 58/00; B60L 58/40; B60L 50/53; B60L 50/70; B60L 50/71; B60L 50/72; B60L 50/75; B60L 55/00
USPC ....................................................... 320/132
See application file for complete search history.

(56) References Cited

U.S. PATENT DOCUMENTS

| | | | | |
|---|---|---|---|---|
| 11,532,946 B2 * | 12/2022 | Kisacikoglu | ............ | B60L 53/14 |
| 2008/0094013 A1 * | 4/2008 | Su | ............ | H02P 5/747 |
| | | | | 180/54.1 |
| 2010/0291445 A1 * | 11/2010 | Igarashi | ................. | B60L 1/003 |
| | | | | 429/428 |
| 2010/0316922 A1 * | 12/2010 | Hamada | ................ | H02M 3/158 |
| | | | | 429/432 |
| 2014/0191720 A1 * | 7/2014 | Sugiyama | ............. | H02J 7/1423 |
| | | | | 320/109 |
| 2016/0185241 A1 * | 6/2016 | Kinomura | ............... | B60L 58/40 |
| | | | | 180/65.245 |
| 2016/0207409 A1 * | 7/2016 | Ueo | ........................ | B60L 50/16 |
| 2017/0129359 A1 * | 5/2017 | Dunlap | .................. | B60L 53/14 |
| 2018/0273022 A1 * | 9/2018 | Bell | ........................ | B60L 53/20 |
| 2019/0135125 A1 * | 5/2019 | Sponheimer | ............ | B60L 53/12 |
| 2019/0359073 A1 * | 11/2019 | Song | ..................... | H02J 7/0068 |
| 2020/0298722 A1 * | 9/2020 | Smolenaers | ............ | H02J 7/345 |
| 2021/0098806 A1 * | 4/2021 | Sakai | ..................... | H02J 7/0048 |
| 2021/0107376 A1 * | 4/2021 | Stolz | ........................ | B60K 1/04 |
| 2021/0155100 A1 * | 5/2021 | Khaligh | ................. | B60L 55/00 |
| 2022/0024328 A1 * | 1/2022 | Cameron | ............... | H01F 27/24 |
| 2022/0285971 A1 * | 9/2022 | Gannamaneni | ....... | B60L 53/305 |

* cited by examiner

*Primary Examiner* — Alexis B Pacheco

(74) *Attorney, Agent, or Firm* — I CANTOR COLBURN LLP

(57) ABSTRACT

A charging system of a vehicle includes a conversion device configured to transfer electrical energy from a fuel cell system to an electric motor of the vehicle via a propulsion bus, a switching assembly configured to selectively connect the conversion device to a charge port of the vehicle, and a controller configured to operate the switching assembly to transition the charging system to a charging mode. The controller is configured to control the conversion device to supply power to a battery of a second vehicle.

20 Claims, 7 Drawing Sheets

FUEL CELL-BASED VEHICLE-TO-VEHICLE CHARGING

INTRODUCTION

The subject disclosure relates to vehicle energy storage, and more specifically, to electrical power transfer from fuel cell vehicles to other vehicles.

Vehicles, including gasoline and diesel power vehicles, as well as electric and hybrid electric vehicles, feature battery storage for purposes such as powering electric motors, electronics and other vehicle subsystems. In situations where an electric vehicle has insufficient battery charge and charging is not immediately available, options such as vehicle-to-vehicle charging can be used. Fuel cell vehicles (e.g., fuel cell EVs and battery-fuel cell vehicles) have high power storage capability and long ranges. Accordingly, it is desirable to provide a system that can utilize the electrical energy capacity of fuel cell vehicles for vehicle-to-vehicle charging.

SUMMARY

In one exemplary embodiment, a charging system of a vehicle includes a conversion device configured to transfer electrical energy from a fuel cell system to an electric motor of the vehicle via a propulsion bus, a switching assembly configured to selectively connect the conversion device to a charge port of the vehicle, and a charge system controller configured to operate the switching assembly to transition the charging system to a charging mode. The charge system controller is configured to control the conversion device to supply power to a battery of a second vehicle.

In addition to one or more of the features described herein, the conversion device is a DC-DC converter of at least one of a propulsion system and the fuel cell system.

In addition to one or more of the features described herein, the fuel cell system is configured to primarily supply electrical power to the electric motor, and the vehicle includes a battery system configured to provide additional power to supplement the fuel cell system.

In addition to one or more of the features described herein, the controller is configured to put the charging system into the charging mode by electrically connecting the charge port to the propulsion bus, electrically connecting the conversion device to the propulsion bus, and electrically disconnecting the battery system from the propulsion bus.

In addition to one or more of the features described herein, the switching assembly includes a first set of switches between the charge port and the propulsion bus, a second set of switches between the conversion device and the propulsion bus, and a third set of switches between the battery system and the propulsion bus, and the controller is configured to put the charging system into the charging mode by closing the first set of switches and the second set of switches, and opening the third set of switches.

In addition to one or more of the features described herein, the vehicle includes a battery system configured to primarily supply electrical power to the electric motor, and the fuel cell system is configured to supply primary power or secondary power to the electric motor.

In addition to one or more of the features described herein, the controller is configured to put the charging system into the charging mode by electrically connecting the charge port to the conversion device, electrically connecting the battery system to the propulsion bus, and electrically disconnecting the fuel cell system from the conversion device.

In addition to one or more of the features described herein, the switching assembly includes a first switch between a positive terminal of the charge port and the propulsion bus, a second switch between a negative terminal of the charge port and the propulsion bus, a third switch between the positive terminal and the conversion device, a first set of switches between the fuel cell system and the conversion device and a second set of switches between the battery system and the propulsion bus, and the controller is configured to put the charging system into the charging mode by opening the first switch, closing the second switch and the third switch, opening the first set of switches, and closing the second set of switches.

In addition to one or more of the features described herein, the controller is configured to control at least one of a fuel system, an air system and a cooling system of the vehicle during the supply of the power to the battery of the second vehicle.

In addition to one or more of the features described herein, the charge port is configured for direct current fast charging (DCFC).

In another exemplary embodiment, a method of vehicle-vehicle charging includes connecting a charge port of a fuel cell-based vehicle to a second vehicle. The fuel cell-based vehicle includes a controller and a charging system, and the charging system includes a conversion device configured to transfer electrical energy from a fuel cell system to an electric motor of the fuel cell-based vehicle via a propulsion bus. The fuel cell-based vehicle also includes a switching assembly configured to selectively connect the conversion device to the charge port of the fuel cell-based vehicle. The method further includes operating the switching assembly by the controller to transition the charging system to a charging mode, and controlling the conversion device to supply power to a battery of the second vehicle according to a requested voltage and current.

In addition to one or more of the features described herein, the fuel cell system is configured to primarily supply electrical power to the electric motor, and the vehicle includes a battery system configured to provide additional power to supplement the fuel cell system, and operating the switching assembly includes electrically connecting the charge port to the propulsion bus, electrically connecting the conversion device to the propulsion bus, and electrically disconnecting the battery system from the propulsion bus.

In addition to one or more of the features described herein 13, the switching assembly includes a first set of switches between the charge port and the propulsion bus, a second set of switches between the conversion device and the propulsion bus, and a third set of switches between the battery system and the propulsion bus, and operating the switching assembly includes closing the first set of switches and the second set of switches, and opening the third set of switches.

In addition to one or more of the features described herein, the vehicle includes a battery system configured to primarily supply electrical power to the electric motor, and the fuel cell system is configured to provide primary power or secondary power to the electric motor, and operating the switching assembly includes electrically connecting the charge port to the conversion device, electrically connecting the battery system to the propulsion bus, and electrically disconnecting the fuel cell system from the conversion device.

In addition to one or more of the features described herein, the switching assembly includes a first switch between a positive terminal of the charge port and the propulsion bus, a second switch between a negative terminal of the charge port and the propulsion bus, a third switch between the positive terminal and the conversion device, a first set of switches between the fuel cell system and the conversion device and a second set of switches between the battery system and the propulsion bus, and operating the switching assembly includes opening the first switch, closing the second switch and the third switch, opening the first set of switches, and closing the second set of switches.

In yet another exemplary embodiment, a vehicle system includes a conversion device configured to transfer electrical energy from a fuel cell system to an electric motor of a vehicle via a propulsion bus, a switching assembly configured to selectively connect the conversion device to a charge port of the vehicle, and a controller configured to operate the switching assembly to transition the vehicle system to a charging mode. The controller is configured to control the conversion device to supply power to a battery of a second vehicle.

In addition to one or more of the features described herein, the fuel cell system is configured to primarily supply electrical power to the electric motor, and the vehicle includes a battery system configured to provide additional power to supplement the fuel cell system, and the controller is configured to put the vehicle system into the charging mode by electrically connecting the charge port to the propulsion bus, electrically connecting the conversion device to the propulsion bus, and electrically disconnecting the battery system from the propulsion bus.

In addition to one or more of the features described herein, the vehicle includes a battery system configured to primarily supply electrical power to the electric motor, and the fuel cell system is configured to provide primary or secondary power to the electric motor, and the controller is configured to put the vehicle system into the charging mode by electrically connecting the charge port to the conversion device, electrically connecting the battery system to the propulsion bus, and electrically disconnecting the fuel cell system from the conversion device.

In addition to one or more of the features described herein, the charge port is configured for direct current fast charging (DCFC).

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
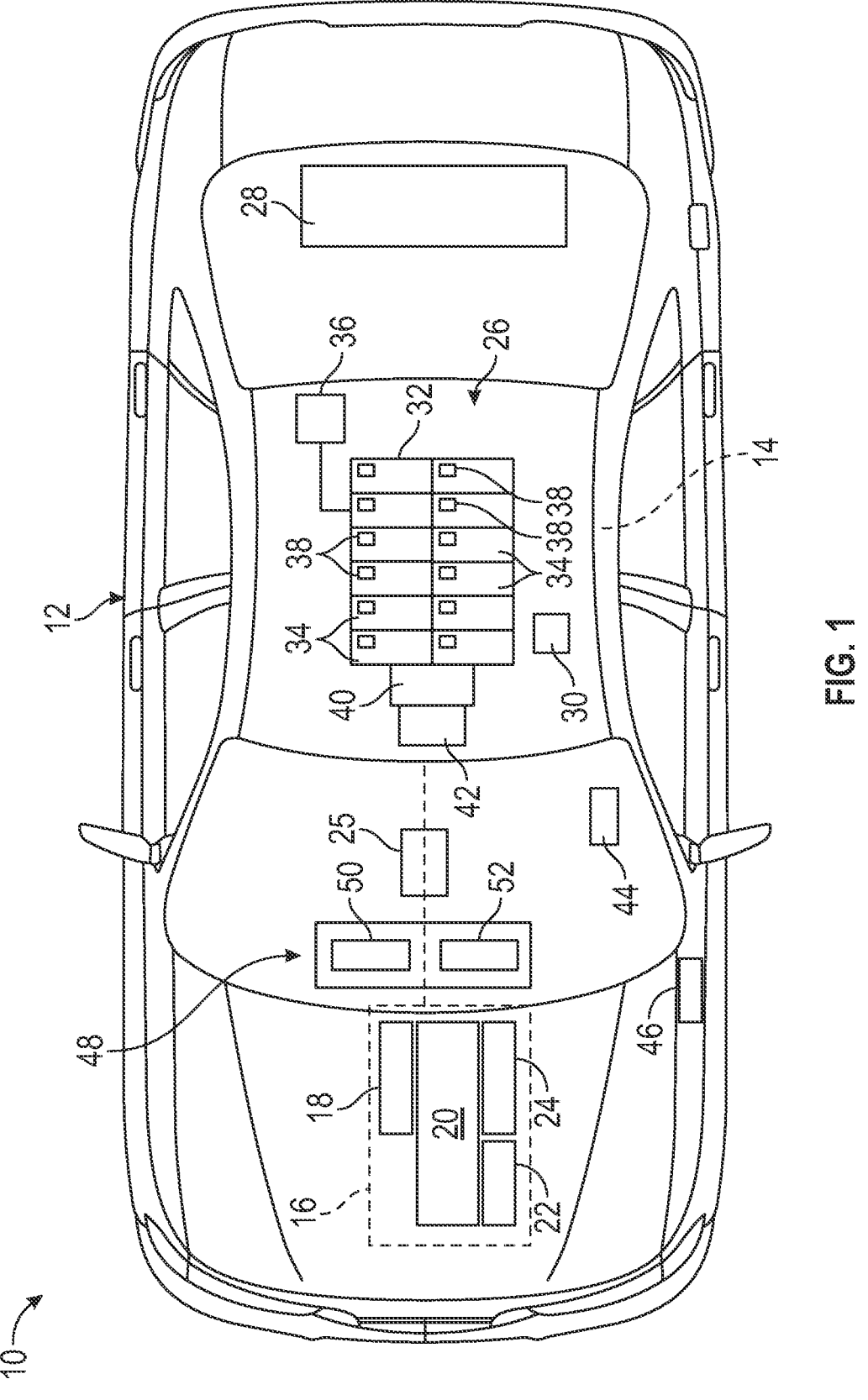
FIG. 1 is a top view of a motor vehicle including a fuel cell system and a charging system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with exemplary embodiments, methods, devices and systems are provided for supplying electric power from a fuel cell-based vehicle. An embodiment of a charging system is configured to provide power to another vehicle (vehicle-to-vehicle or V2V charging) or energy storage system. The charging system includes a conversion device and one or more switches or switching assemblies for selectively connecting a vehicle's fuel cell and/or battery to a charge port. The charging system also includes a controller or controllers for operating various switches and thereby transitioning between a propulsion mode (or other operating mode) and a charging mode, and for controlling the conversion device to regulate charging parameters (e.g., voltage, current, etc.) and control energy flow. For example, the charging system can be incorporated into a fuel cell-based vehicle in a cost effective manner to provide direct current (DC) fast charging (DCFC).

Embodiments described herein present numerous advantages and technical effects. The embodiments provide for effective V2V charging capability from a fuel cell vehicle to another vehicle (e.g., an EV or hybrid), including both conventional charging and DCFC. The embodiments provide an additional resource for providing charging services for electric vehicles. Current fuel cell vehicle architectures are not suitable for using the electrical energy capacity therein for DCFC or other desired V2V charging schemes; the embodiments present a solution to this problem. In addition, as the embodiments may utilize already existing components (e.g., controllers and/or DC-DC converters), the embodiments provide a cost effective solution.

Although embodiments are discussed in conjunction with V2V charging, the embodiments are not so limited. For example, the charging systems described herein can be configured to supply power to any desired storage system (e.g., vehicle-to-everything or V2X charging).

The embodiments are not limited to use with any specific vehicle and may be applicable to various contexts. For example, embodiments may be used with automobiles, trucks, aircraft, construction equipment, farm equipment, automated factory equipment and/or any other device or system that utilizes fuel cell energy storage.

FIG. 1 shows an embodiment of a motor vehicle 10 that utilizes fuel cell energy storage. The vehicle 10 may be a fuel cell vehicle that primarily or exclusively uses a fuel cell system to provide electric power for propulsion (referred to herein as a fuel cell electric vehicle or FCEV). Alternatively, the vehicle 10 may utilize a hybrid fuel cell and battery system for propulsion (referred to herein as a battery-fuel cell vehicle or BFCV). The vehicle 10 may be any suitable type of vehicle, such as a passenger vehicle (e.g., car or truck) or a commercial vehicle.

The vehicle 10 includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem and others.

The propulsion system 16 includes an electric motor 18, and components of a fuel cell system. It is noted that the vehicle 10 may have a single electric motor as shown, or may have multiple electric motors for propulsion (e.g., electric motors connected to front and rear wheels).

In an embodiment, the fuel cell system includes a fuel cell stack 20, a fuel cell control module (FCCM) 22, and other components such as a coolant tank and air filter (not shown). The propulsion system 16 also includes a power converter and sensing module (PCSM) 24 that is electrically connected to the fuel cell stack 20 and to a battery system 26 to provide regulated voltage and current. The regulated voltage and current are supplied to the electric motor 18 via an inverter module 42. The PCSM 24 may be configured to control energy transfer to and from the fuel cell stack 20, and may control other aspects of the fuel cell system, such as air flow and cooling. The fuel cell stack 20 is connected to a source of hydrogen fuel, such as one or more hydrogen storage tanks 28. A controller 30 may be provided for controlling fuel supply to the fuel cell stack 20.

The battery system 26 may be configured as a rechargeable energy storage system (RESS). If the vehicle 10 is a FCEV, the fuel cell system may be the primary power supply to the motor 18, and the battery system 26 may be a low energy battery that can be used to supplement the fuel cell system. If the vehicle 10 is a BFCV, the battery system 26 may be a high energy battery system that can be used as a primary source of power. A BFCV may use the fuel cell system as a secondary system to supplement the battery system 26, or may use the fuel cell system as another primary source of power.

In an embodiment, the battery system 26 includes a battery assembly such as a high voltage (HV) battery pack 32 having a plurality of battery modules 34. Each of the battery modules 34 includes a number of individual cells (not shown). The battery system 26 may also include a monitoring unit 36 configured to receive measurements from sensors 38. Each sensor 38 may be an assembly or system having one or more sensors for measuring various battery and environmental parameters, such as cell/module temperatures, current and individual cell voltages and total pack voltages.

The battery system 26 also includes the inverter module 42. The inverter module 42 (e.g., a traction power inversion unit or TPIM) converts direct current (DC) power from the battery system 26 to three-phase alternating current (AC) power to drive the motor 18.

The vehicle 10 includes a charging system that can be used to supply electrical power to charge another energy storage system, such as an electric or hybrid vehicle battery (e.g., vehicle-to-vehicle charging). The charging system includes a charge port 46, a conversion device for managing the transmission of power, and a switching assembly (not shown). The switching assembly may be incorporated into any desired component, such as the FCCM 22 or the PCSM 24, or a junction box 25. The switching assembly is operable by a charge system controller to selectively connect the conversion device to the fuel cell system and/or the battery system 26, and also to selectively connect the conversion device to a charge port 46. In this way, the switching assembly causes the vehicle to switch between using electrical power to drive the motor 18 and using power to charge another vehicle.

In an embodiment, the conversion device is a DC-DC converter, which may be a unidirectional boost converter or a bi-directional buck-boost converter. The DC-DC converter, in an embodiment, is a pre-existing DC-DC converter used by one or more other vehicle systems. For example, the conversion device is a DC-DC converter (not shown) in the PCSM 24.

The charging system may also be used to charge the battery pack 32. To manage receiving power to charge the battery system 26, the charge port 46 may be connected to an onboard charging module (OBCM) 44 that is electrically connected to the battery pack 32.

The charging system controller may be any suitable processing device or unit, such as a vehicle controller, or may be a dedicated controller or control module. For example, an existing control unit in the FCCM 22, the PCSM 24, the inverter module 42 or the OBCM 44 is configured as a charge system controller for operating the switching assembly and controlling the DC-DC converter during V2V charging.

The vehicle 10 also includes a computer system 48 that includes one or more processing devices 50 and a user interface 52. The computer system 48 may communicate with the charging system controller, for example, to provide commands thereto in response to a user input. The various processing devices, modules and units may communicate with one another via a communication device or system, such as a controller area network (CAN) or transmission control protocol (TCP) bus.

Figure 2:
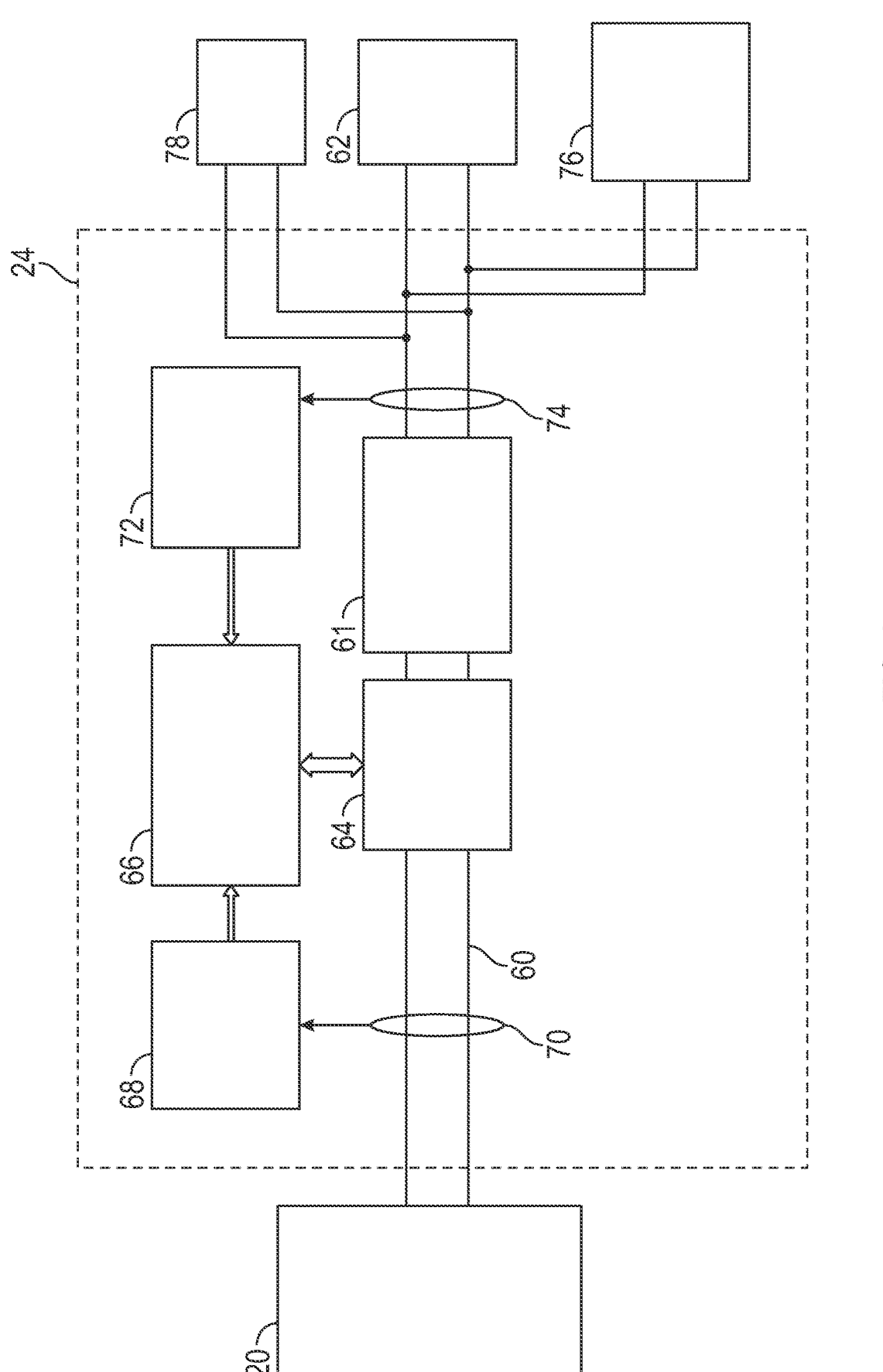
FIG. 2 depicts components of a fuel cell system and a charging system of a vehicle, including a conversion device used by the charging system, in accordance with an exemplary embodiment.

FIG. 2 depicts components of the fuel cell system including the fuel cell stack 20, which is electrically connected to a bus 60 of the power converter and sensing module (PCSM) 24. The bus 60 is in turn connected to the battery system 26 via, for example, a HV DC interface 61 and a HV DC output bus 62.

The PCSM 24 includes a conversion device 64, which in this example includes a boost converter having an inductor, a switch (e.g., a metal-oxide-semiconductor field-effect transistor (MOSFET) or power MOSFET), a diode and a capacitor (not shown) for stepping up or boosting voltage supplied from the fuel cell stack 20. As discussed further herein, the conversion device 64 may be configured as a bi-directional converter that can boost voltage (e.g., when supplying power to the battery system 26), and buck or step down voltage (e.g., when supplying power from the converter 64 to the charge port 46), by using a MOSFET with suitable body diode.

The PCSM 24 includes various sensors for measuring parameters such as input voltage and current to the conversion device 64, and output voltage and current from the conversion device. For example, a converter control and temperature sensing interface 66 (i.e., control interface 66) receives input voltage and current readings 68 from sensors 70, and output voltage and current readings 72 from sensors 74. Other sensors may be included for monitoring various temperatures (e.g., power semiconductor device case temperature, coolant inlet and outlet temperatures, etc.) and pressures (e.g., air and fuel pressure).

The PCSM 24 monitors and/or controls other components of the fuel cell system and/or battery system 26. For example, the PCSM 24 supplies power to a compressor (not shown) via a compressor power inverter module (CPIM) 76. Other components may be connected to the PCSM 24, such as a coolant pump 78.

One or more components are included in a vehicle-to-vehicle (V2V) charging system, which utilizes a fuel cell powered vehicle to provide on-demand V2V charging. The V2V charging system may provide DC fast charging (DCFC) capability and/or other charging capability. DCFC is a technology that permits high power charging using high voltage DC. For example, DCFC charges at a voltage of about 800 V, as compared to conventional charging at 400 V.

Figure 3:
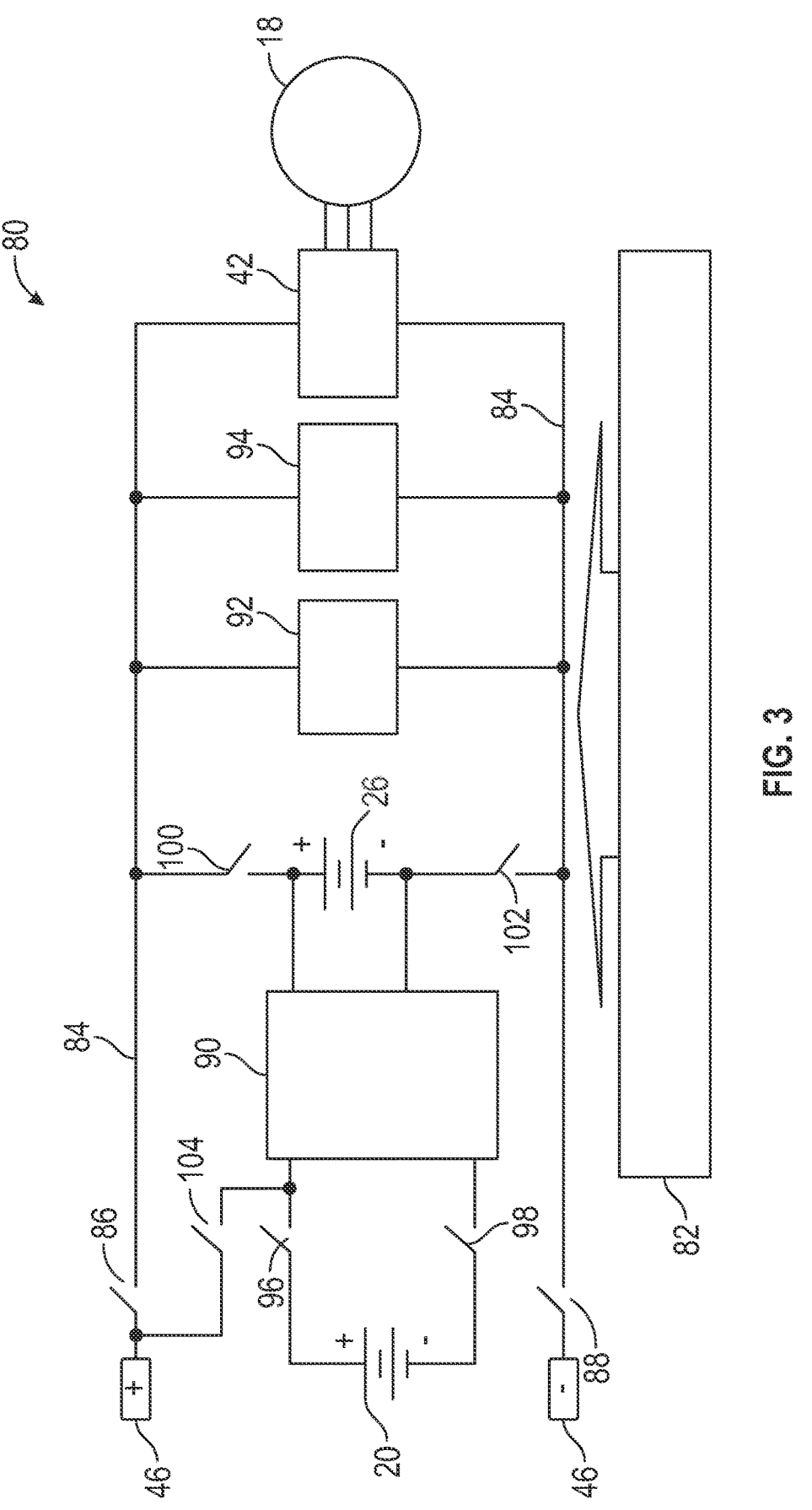
FIG. 3 depicts a charging system of a battery-fuel cell (BFC) vehicle, in accordance with an exemplary embodiment.
Figure 4:
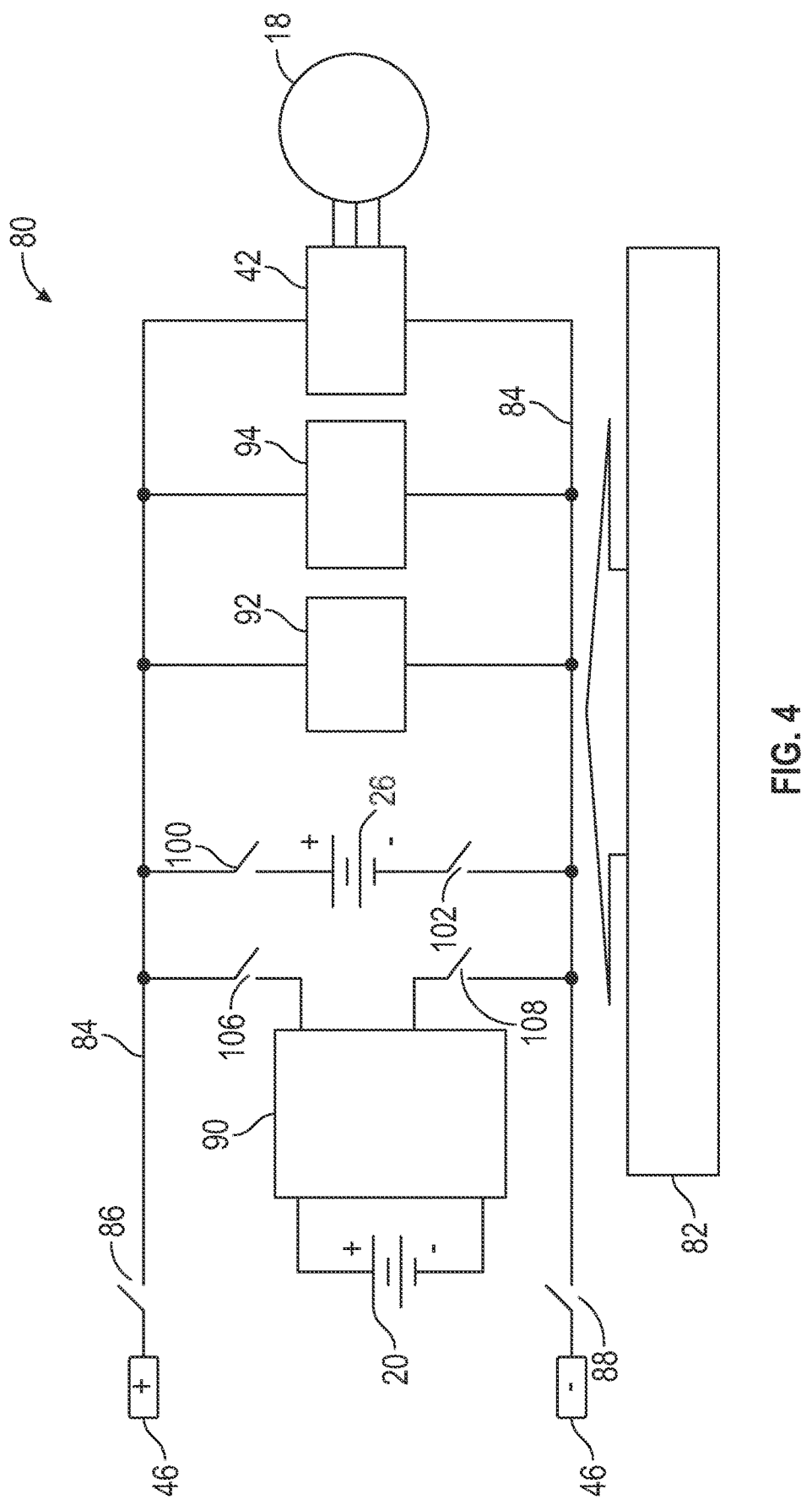
FIG. 4 depicts a charging system of a fuel cell electric vehicle (FCEV), in accordance with an exemplary embodiment.

FIGS. 3 and 4 depict embodiments of a charging system 80 that is configured for providing V2V charging using a vehicle having a fuel cell system. The charging system 80 is controlled by a charging system controller 82, which may be any suitable controller, control device or system, such as the controller 30, a vehicle controller or battery management system (BMS).

FIG. 3 depicts an embodiment of the charging system 80 that is configured for providing V2V charging from a BFCV (e.g., a battery-fuel cell truck or BFT). In this embodiment, the battery system 26 is a high energy battery that is capable of driving the electric motor 18. The vehicle 10 can be used as a hybrid in which the electric motor 18 can be driven by the battery system 26 or the fuel cell stack 20. Alternatively, the fuel cell stack 20 can be used as a secondary power source (i.e., power is primarily provided by the battery system 26 and the fuel cell stack 20 supplements the battery system 26).

The charging system 80 is configured to control a switching assembly that includes various switches to selectively connect the battery system 26 (B1) to the charge port 46 to provide DCFC or another charging scheme. The charge port 46 is selectively connected to a propulsion bus 84 by switches 86 (SC1) and 88 (SC2).

The fuel cell stack 20 (FC1) is connected to a conversion device 90. The conversion device 90, in an embodiment, is a component of the propulsion system 16, such as the PCSM 24. For example, the PCSM 24 includes a DC-DC converter that is interfaced to the Fuel Cell Control Module (FCCM) 22. The conversion device 90 may be unidirectional or bidirectional (e.g., as a buck-boost converter).

Additional components may be connected to the propulsion bus 84. For example, an auxiliary power module (APM) 92 is connected to the propulsion bus 84. The APM 92 may be used to provide low voltage (LV) power (e.g., 12V to 15.5V) to electronics and other electrically powered vehicle components. An electronic controller driven air conditioning compressor (ACEC) 94 for the cooling system may also be connected to the propulsion bus 84. During a charging procedure, the controller 82 can control the ACEC 94 and parameters of the fuel cell system (e.g., mass air flow rate and fuel rate) in order to maintain a desired power output.

The conversion device 90 is selectively connected to the fuel cell stack 20 by switches 96 (SF1) and 98 (SF2). The battery system 26 and the conversion device 90 are selectively connected to the propulsion bus 84 via switches 100 (SB1) and 102 (SB2). A switch 104 (SC3) is provided between a positive terminal of the charge port 46 and the conversion device 90, which is controlled (in conjunction with control of other switches) to switch between a propulsion mode and a charging mode.

The controller 82 controls the various switches in order to change between a key-off/standby mode, propulsion mode and/or a charging mode. In the key off mode or stand-by mode, all switches connecting the fuel cell system and battery system to the propulsion HV bus 84 are disconnected and the TPIM 42 is disabled.

In the propulsion mode, the battery system 26 supplies power to the electric motor 18 via the TPIM 42 and supplements the power as needed with the fuel cell stack 20.

To put the charging system 80 into the propulsion mode, the switch 96 (SF1) and the switch 98 (SF2) are closed (i.e., in an ON position) so that the fuel cell stack 20 can supply power to the conversion device 90 and the electric motor 18 via the TPIM 42. The switch 100 (SB1) and the switch 102 (SB2) are also closed to connect the fuel cell stack 20 output through the conversion device 90 and the battery system 26 to the propulsion bus 84. The switch 86 (SC1), the switch 88 (SC2) and the switch 104 (SC3) are open (i.e., in an OFF position) so that the charge port 46 is disconnected from the propulsion bus 84 and the fuel cell stack 20.

In the charging mode, such as a V2V DCFC mode, the fuel cell system is disconnected from the propulsion system 16, and the battery system 26 is connected to the charge port 46 to supply power to another vehicle via the conversion device 90, which may be operated in reverse mode (as a buck-converter for charging lower voltage recipient storage devices). Power output in the charging mode is to the charge port 46.

To put the charging system 80 into the charging mode, the switch 96 (SF1) and the switch 98 (SF2) are open so that the fuel cell stack 20 is disconnected from the conversion device 90 and the rest of the propulsion system. The switch 100 (SB1) and the switch 102 (SB2) are closed. Switch 86 (SC1) is open, and switches 88 (SC2) and 104 (SC3) are closed to connect the charge port 46 to the battery system 26 so that the battery system 26 can supply power to the charge port 46 and a second vehicle.

The charging system 80 may be put in a normal DCFC input mode where the vehicle storage device 22 is directly charged from a compatible charging station such as an 800V rated charging station. In the normal DCFC input mode, the switch 96 (SF1) and the switch 98 (SF2) are open, and the switch 100 (SB1) and the switch 102 (SB2) are closed. Switches 86 (SC1) and 88 (SC2) are closed, and the switch 104 (SC3) is open.

The following table illustrates various operating modes of the embodiment of FIG. 3:

| Operating Mode | SF1 Switch position | SF2 Switch position | SB1 Switch position | SB2 Switch position | SC1 Switch position | SC2 Switch position | SC3 Switch position |
|---|---|---|---|---|---|---|---|
| Key OFF | OFF | OFF | OFF | OFF | OFF | OFF | OFF |
| Propulsion | ON | ON | ON | ON | OFF | OFF | OFF |
| Charging | OFF | OFF | ON | ON | OFF | ON | ON |
| DCFC Input | OFF | OFF | ON | ON | ON | ON | OFF |

FIG. 4 depicts an embodiment of the charging system 80 that is configured for providing V2V charging from the vehicle 10 when the vehicle is configured as a FCEV. In this embodiment, power is primarily provided to the propulsion bus 84 from the fuel cell stack 20, and the battery system 26 is a high power, low energy battery system that supplements the fuel cell system.

In this embodiment, the charging system 80 is configured to control switching devices to selectively connect the fuel cell stack 20 (FC1) to the charge port 46 to provide DCFC or another charging scheme. The system 80 includes the switch 86 (SC1) and the switch 88 (SC2) for selective connection to the charge port 46 (the switch 104 is omitted in this embodiment).

Also in this embodiment, the conversion device 90 and the battery system 26 are connected in parallel to the propulsion bus 84, and include respective sets of switches so that the battery system 26 and the conversion device 90 can be separately connected and disconnected from the bus 84. The battery system 26 is selectively connected to the bus via the switches 100 (SB1) and 102 (SB2). The conversion device 90 is selectively connected to the bus via a switch 106 (SA1) and a switch 108 (SA2). Although not shown, a set of switches may be included to allow selective connection between the fuel cell stack 20 and the conversion device 90.

To put the charging system 80 into the propulsion mode, the switch 106 (SA1) and the switch 108 (SA2) are closed. The switch 100 (SB1) and switch 102 (SB2) are closed, and the switch 86 (SC1) and the switch 88 (SC2) are kept open.

To put the charging system 80 into the V2V charging mode, the switch 106 (SA1) and the switch 108 (SA2) are closed. Switch 100 (SB1) and switch 102 (SB2) are open, and the switches 86 (SC1) and 88 (SC2) are closed.

To put the charging system 80 into the normal DCFC input mode, the switch 106 (SA1) and the switch 108 (SA2) are open. The switches 100 (SB1) and 102 (SB2) are closed, and the switches 86 (SC1) 88 (SC2) are closed.

The following table illustrates various operating modes of the embodiment of FIG. 4:

| Operating Mode | SF1 Switch position | SF2 Switch position | SB1 Switch position | SB2 Switch position | SC1 Switch position | SC2 Switch position |
|---|---|---|---|---|---|---|
| Key OFF | OFF | OFF | OFF | OFF | OFF | OFF |
| Propulsion | ON | ON | ON | ON | OFF | OFF |
| Charging | ON | ON | OFF | OFF | ON | ON |
| DCFC Input | OFF | OFF | ON | ON | ON | ON |

In the embodiments of FIGS. 3 and 4, additional diagnostics and protection functions may be incorporated into the controller 82 (e.g., FCCM) to ensure the most efficient V2V charging at the requested power, voltage and current level using existing sensors and serial communication channels between various controllers.

Any suitable device may be employed as a switch. For example, the switches can include solid state relays and transistors such as Silicon (Si) insulated gate bipolar transistors (IGBTs), and field-effect transistors (FETs). Examples of FETs include metal-oxide-semiconductor FETs (MOSFETs), Si MOSFETs, silicon carbide (SiC) MOSFETs, gallium nitride (GaN) high electron mobility transistors (HEMTs), and SiC junction-gate FETs (JFETs). Other examples of switches that can be used include diamond, gallium oxide and other wide band gap (WBG) semiconductor-based power switch devices.

Figure 5:
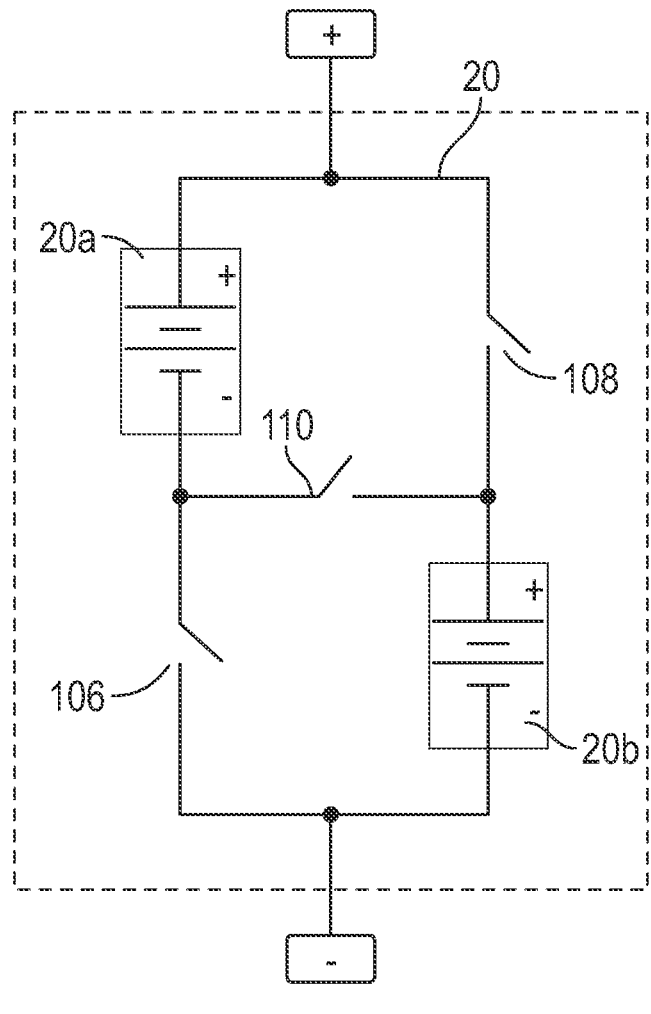
FIG. 5 is a flow diagram depicting aspects of a method of supplying charge from a fuel cell-based vehicle, in accordance with an exemplary embodiment.

In an embodiment, the fuel cell stack 20 is part of a variable voltage stack that is configured to output electrical power at different voltages. FIG. 5 depicts an example of the fuel cell stack 20, in which the stack 20 has been split into two sub-stacks 20a and 20b that can be connected in series or parallel. As shown, the switch 106 (SA1) is connected in series with the sub-stack 20a, and the switch 108 (SAB) is connected in series with the sub-stack 20b. The two sub-stacks 20a and 20b can be connected in parallel by opening (or keeping open) the switch 110 (SA3) and closing (or keeping closed) the switches 106 (SA1) and 108 (SA2). This provides a voltage equal to that of a sub-stack at the fuel cell terminals. To connect the sub-stacks 20a and 20b in series, the switch 110 (SA3) is closed and the switches 106 (SA1) and 108 (SA2) are open. When the sub-stacks 20a and 20b are in series, the voltage at the fuel cell terminals is the sum of that of individual sub-stacks. Electromechanical relays or solid state switches can be used.

The switches, in this embodiment, are operated to control output voltage. For example, to provide a relatively low voltage, the sub-stack 20a is connected in parallel to the sub-stack 20b by opening the switch 110 (SA3) and closing the switches 106 (SA1) and 108 (SA2). To provide a relatively high voltage, the sub-stacks 20a and 20b are connected in series by closing the switch 100 (SA3) and opening the switches 106 (SA1) and 108 (SA2). In an example, the reconfigurable fuel-cell stack provides lower or higher voltage to charge a 400V class or 800V class vehicle or storage system through the conversion device 90.

Figure 6:
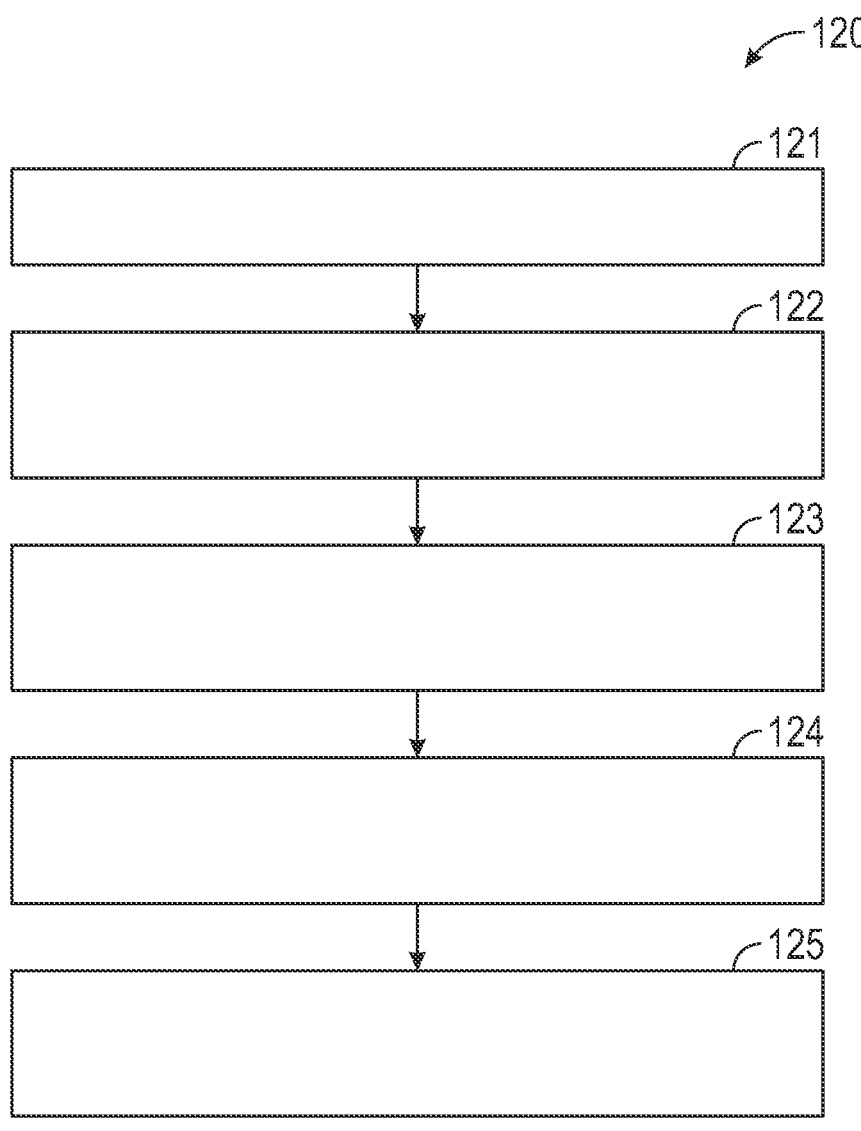
FIG. 6 depicts a variable output fuel cell stack, in accordance with an exemplary embodiment.

FIG. 6 illustrates embodiments of a method 120 of controlling a propulsion system and fuel cell system, and controlling the transfer of charge between a fuel cell-based vehicle and an energy storage systems. In the method 120, charge is transferred from the fuel-based vehicle to a battery of a second vehicle. It is noted that the method 120 may be used to charge any suitable storage system.

Aspects of the method 120 may be performed by a processor or processors disposed in a vehicle, such as the controller 82. The method 120 is described in conjunction with an example in which the controller 82 is part of the PCSM 24 for illustration purposes, however the method 120 is not so limited, as the method may be performed by any suitable processing device or system, or combination of processing devices.

The method 120 includes a number of steps or stages represented by blocks 121-125. The method 120 is not limited to the number or order of steps therein, as some steps represented by blocks 121-125 may be performed in a different order than that described below, or fewer than all of the steps may be performed.

At block 121, the controller 82 determines if it is desired to charge a second vehicle battery by transferring energy from the battery pack 32 of the vehicle 10. The determination may be based on received a request (e.g., via user interaction with the vehicle 10 or a request from a second vehicle or other remote entity). For example, the vehicle 10 may be a service vehicle (e.g., fuel cell medium or heavy duty truck) or any other fuel cell vehicle. Determination as to whether charging is desired may be based on user input, a wireless signal from the second vehicle or other information.

For example, the charging system and/or other system receives a request via a V2V communication link from the second vehicle, which includes a request for V2V charging and specifies a requested current, voltage and power. The charging system and/or other system may perform an authentication procedure to ensure that the second vehicle is authorized for V2V charging (e.g., the system authenticates the second vehicle to determine whether the second vehicle is part of a vehicle fleet).

At block 122, the second vehicle is connected (e.g., via a charge cable) to the charge port 46. Connectivity may be verified (e.g., via wireless communication between the vehicle 10 and the second vehicle). The voltage of the second vehicle's battery (second vehicle battery voltage) is read. The processing device may determine various charge parameters such as the second vehicle's nominal battery voltage, maximum allowable charge current and desired charge energy.

At block 123, the controller 82 transitions the vehicle 10 from a propulsion mode or a standby mode to a charging mode. The controller 80 may put the vehicle in charging mode by controlling switches as discussed herein (e.g., controlling the switching assembly of the embodiment of FIG. 3 or FIG. 4). If the fuel cell stack 20 is a variable output fuel stack (e.g., the embodiment of FIG. 5), the switches of the fuel stack 20 are operated to select a desired output voltage.

At block 124, the controller 82 controls the conversion device 90 to supply output power according to charging parameter specifications. For example, if DCFC is used, the conversion device 90 is used to step up or boost the voltage to a voltage of about 800 V. The controller 82 also controls aspects of the fuel cell system by controlling fuel cell inputs (e.g., air flow and fuel flow rate) to maximize efficiency at the specified voltage.

At block 125, the second vehicle is disconnected from the charge port 46. The controller 82 transitions the vehicle 10 from the charging mode to the standby mode and/or the propulsion mode. For example, the controller 82 transitions back to the standby mode, and subsequently transitions to the propulsion mode when so commanded by controlling switches as discussed herein.

Figure 7:
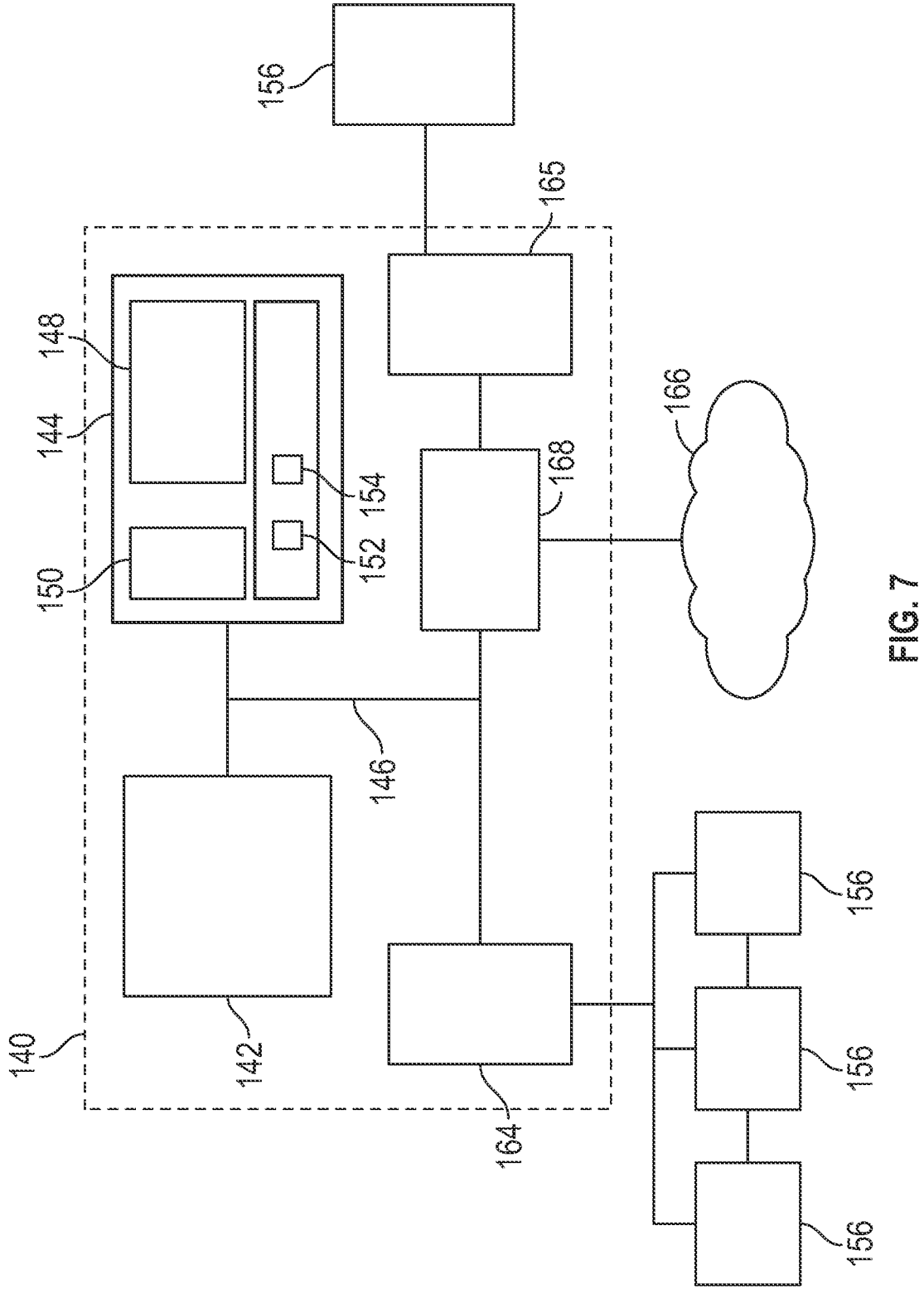
FIG. 7 depicts a computer system in accordance with an exemplary embodiment.

FIG. 7 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a propulsion system, and a module 154 may be included to perform functions related to switching between operating modes and controlling charging parameters (e.g., by controlling a conversion device as discussed herein). The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A charging system of a vehicle, comprising:
a conversion device configured to transfer electrical energy from a fuel cell system to an electric motor of the vehicle via a propulsion bus, wherein the vehicle includes a battery system configured to primarily supply electrical power to the electric motor, and the fuel cell system is configured to supply primary power or secondary power to the electric motor;
a switching assembly configured to selectively connect the conversion device to a charge port of the vehicle; and
a controller configured to operate the switching assembly to transition the charging system to a charging mode, the controller configured to control the conversion device to supply power to a battery of a second vehicle, wherein the controller is configured to put the charging system into the charging mode by electrically connecting the charge port to the conversion device, electrically connecting the battery system to the propulsion bus, and electrically disconnecting the fuel cell system from the conversion device.

2. The charging system of claim 1, wherein the conversion device is a DC-DC converter of at least one of a propulsion system and the fuel cell system.

3. The charging system of claim 1, wherein the controller is configured to transition from the charging mode to a propulsion mode by electrically disconnecting the charge port from the conversion device, and electrically connecting the fuel cell system to the conversion device.

4. The charging system of claim 1, wherein the fuel cell system includes a plurality of fuel cells, and the switching assembly includes a set of switches configured to connect the plurality of fuel cells in series or in parallel.

5. The charging system of claim 4, wherein the switching assembly includes a first set of switches, and the controller is configured to operate the first set of switches to control an output voltage from the fuel cell system.

6. The charging system of claim 1, wherein the conversion device includes a bi-directional converter.

7. The charging system of claim 6, wherein the conversion device includes a DC-DC converter connected to the propulsion bus.

8. The charging system of claim 1, wherein the switching assembly includes a first switch between a positive terminal of the charge port and the propulsion bus, a second switch between a negative terminal of the charge port and the propulsion bus, a third switch between the positive terminal and the conversion device, a first set of switches between the fuel cell system and the conversion device and a second set of switches between the battery system and the propulsion bus, and the controller is configured to put the charging system into the charging mode by opening the first switch, closing the second switch and the third switch, opening the first set of switches, and closing the second set of switches.

9. The charging system of claim 1, wherein the controller is configured to control at least one of a fuel system, an air system and a cooling system of the vehicle during the supply of the power to the battery of the second vehicle.

10. The charging system of claim 1, wherein the charge port is configured for direct current fast charging (DCFC).

11. A method of vehicle-vehicle charging, comprising:
connecting a charge port of a fuel cell-based vehicle to a second vehicle, the fuel cell-based vehicle including a controller and a charging system, the charging system including a conversion device configured to transfer electrical energy from a fuel cell system to an electric motor of the fuel cell-based vehicle via a propulsion bus, and a switching assembly configured to selectively connect the conversion device to the charge port of the fuel cell-based vehicle;
operating the switching assembly by the controller to transition the charging system to a charging mode; and
controlling the conversion device to supply power to a battery of the second vehicle according to a requested voltage and current, wherein the vehicle includes a battery system configured to primarily supply electrical power to the electric motor, and the fuel cell system is configured to provide primary power or secondary power to the electric motor, and wherein operating the switching assembly includes electrically connecting the charge port to the conversion device, electrically connecting the battery system to the propulsion bus, and electrically disconnecting the fuel cell system from the conversion device.

12. The method of claim 11, further comprising transitioning from the charging mode to a propulsion mode by electrically disconnecting the charge port from the conversion device, and electrically connecting the fuel cell system to the conversion device.

13. The method of claim 12, wherein the fuel cell system includes a plurality of fuel cells, and the switching assembly includes a set of switches configured to connect the plurality of fuel cells in series or in parallel.

14. The method of claim 13, further comprising operating the first set of switches to control an output voltage from the fuel cell system.

15. The method of claim 11, wherein the switching assembly includes a first switch between a positive terminal of the charge port and the propulsion bus, a second switch between a negative terminal of the charge port and the propulsion bus, a third switch between the positive terminal and the conversion device, a first set of switches between the fuel cell system and the conversion device and a second set of switches between the battery system and the propulsion bus, and operating the switching assembly includes opening the first switch, closing the second switch and the third switch, opening the first set of switches, and closing the second set of switches.

16. The method of claim 11, wherein the charge port is configured for direct current fast charging (DCFC).

17. A vehicle system, comprising:
a conversion device configured to transfer electrical energy from a fuel cell system to an electric motor of a vehicle via a propulsion bus;
a switching assembly configured to selectively connect the conversion device to a charge port of the vehicle; and
a controller configured to operate the switching assembly to transition the vehicle system to a charging mode, the controller configured to control the conversion device to supply power to a battery of a second vehicle, wherein the vehicle includes a battery system configured to primarily supply electrical power to the electric motor, and the fuel cell system is configured to provide primary or secondary power to the electric motor, and wherein the controller is configured to put the vehicle system into the charging mode by electrically connecting the charge port to the conversion device, electrically connecting the battery system to the propulsion bus, and electrically disconnecting the fuel cell system from the conversion device.

18. The vehicle system of claim 17, wherein the controller is configured to transition from the charging mode to a propulsion mode by electrically disconnecting the charge port from the conversion device, and electrically connecting the fuel cell system to the conversion device.

19. The vehicle system of claim 17, wherein the fuel cell system includes a plurality of fuel cells, and the switching assembly includes a set of switches configured to connect the plurality of fuel cells in series or in parallel.

20. The vehicle system of claim 17, wherein the charge port is configured for direct current fast charging (DCFC).

* * * * *